US009801266B2

(12) United States Patent
Foret

(10) Patent No.: US 9,801,266 B2
(45) Date of Patent: Oct. 24, 2017

(54) APPARATUS AND METHOD FOR SINTERING PROPPANTS

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 0 days.

(21) Appl. No.: 15/601,122

(22) Filed: May 22, 2017

(65) Prior Publication Data

US 2017/0257937 A1 Sep. 7, 2017

Related U.S. Application Data

(62) Division of application No. 14/207,172, filed on Mar. 12, 2014, now Pat. No. 9,699,879.

(Continued)

(51) Int. Cl.

*B29C 71/02* (2006.01)
*H05H 1/48* (2006.01)

(Continued)

(52) U.S. Cl.

CPC ................ *H05H 1/48* (2013.01); *H05H 1/42* (2013.01); *H05H 1/46* (2013.01); *H05H 2001/4667* (2013.01)

(58) Field of Classification Search

CPC .......... C09K 8/805; C09K 8/80; C04B 38/00; C04B 35/536; C23C 18/40; C23C 18/00

(Continued)

(56) References Cited

U.S. PATENT DOCUMENTS 481,979 A 9/1892 Stanley
501,732 A 7/1893 Roeske (Continued)

FOREIGN PATENT DOCUMENTS

CA 2304938 2/2001
EP 237216 9/1987

(Continued)

OTHER PUBLICATIONS

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.

(Continued)

*Primary Examiner* — Nahida Sultana

(74) *Attorney, Agent, or Firm* — Daniel J. Chalker; Edwin S. Flores; Chalker Flores, LLP

(57) ABSTRACT

An apparatus and method sinters or partially sinters green pellets in a selected temperature range to make proppant particles as the green pellets pass between an electrical arc and a gas flowing in the vortex path and exit an underflow of a vessel. The vessel has an overflow disposed in a first end, an underflow disposed in a second end, a middle portion having a circular cross-section disposed between the first end and the second end, and a tangential inlet proximate to the first end such that a gas from the tangential inlet flows along a vortex path from the first end to the second end of the vessel. A first electrode extends through the overflow and a second electrode extends through the underflow. The electrodes are used to create the open electrical arc. One or more feed tubes extend through the overflow proximate to the first electrode.

29 Claims, 4 Drawing Sheets

Related U.S. Application Data

(60) Provisional application No. 61/777,999, filed on Mar. 12, 2013.

(51) Int. Cl.
*H05H 1/46* (2006.01)
*H05H 1/42* (2006.01)

(58) Field of Classification Search
USPC ...... 264/485; 210/198.1, 243, 512.1, 748.15, 210/788; 425/72.1; 427/466, 213, 457, 427/569
See application file for complete search history.

(56) References Cited

U.S. PATENT DOCUMENTS

| | | | | |
|---|---|---|---|---|
| 1,698,096 | A | 1/1929 | Hirschfeld | |
| 1,727,361 | A | 9/1929 | Ashcraft | |
| 2,139,657 | A | 12/1938 | Baeckler | |
| 2,260,823 | A | 10/1941 | Bettis | |
| 2,705,219 | A | 3/1955 | Heiskell et al. | |
| 2,784,294 | A | 3/1957 | Gravert | |
| 2,898,441 | A | 8/1959 | Reed et al. | |
| 2,923,809 | A | 2/1960 | Clews et al. | |
| 3,004,189 | A | 10/1961 | Giannini | |
| 3,082,314 | A | 3/1963 | Arata et al. | |
| 3,131,288 | A | 4/1964 | Browning et al. | |
| 3,201,337 | A | 8/1965 | Eichelberger et al. | |
| 3,242,305 | A | 3/1966 | Kane et al. | |
| 3,254,770 | A | 6/1966 | Herndon | |
| 3,292,028 | A | 12/1966 | Van Ornum | |
| 3,324,334 | A | 6/1967 | Reed | |
| 3,428,125 | A | 2/1969 | Parker | |
| 3,534,388 | A | 10/1970 | Ito et al. | |
| 3,567,898 | A | 3/1971 | Fein | |
| 3,567,921 | A | 3/1971 | Holiday | |
| 3,598,731 | A | 8/1971 | Frykhult et al. | |
| 3,619,549 | A | 11/1971 | Hogan et al. | |
| 3,641,308 | A | 2/1972 | Couch, Jr. et al. | |
| 3,769,517 | A | 10/1973 | Coleman | |
| 3,772,172 | A | 11/1973 | Zhagatspanian et al. | |
| 3,787,247 | A | 1/1974 | Couch, Jr. | |
| 3,798,784 | A | 3/1974 | Kovats et al. | |
| 3,826,920 | A | 7/1974 | Woodroffe et al. | |
| 3,830,428 | A | 8/1974 | Dyos | |
| 3,833,787 | A | 9/1974 | Couch, Jr. | |
| 3,917,479 | A * | 11/1975 | Sayce | C03B 5/025 75/10.19 |
| 3,924,246 | A | 12/1975 | Scherer | |
| 3,958,636 | A | 5/1976 | Perkins | |
| 3,998,477 | A | 12/1976 | Delahaye et al. | |
| 4,002,918 | A | 1/1977 | Graentzel | |
| 4,018,973 | A | 4/1977 | Paton et al. | |
| 4,067,390 | A | 1/1978 | Camacho et al. | |
| 4,169,503 | A | 10/1979 | Scott | |
| 4,203,022 | A | 5/1980 | Couch, Jr. et al. | |
| 4,265,747 | A | 5/1981 | Copa et al. | |
| 4,279,743 | A | 7/1981 | Miller | |
| 4,296,066 | A | 10/1981 | Schenck | |
| 4,311,897 | A | 1/1982 | Yerushalmy | |
| 4,317,041 | A | 2/1982 | Schenck | |
| 4,344,839 | A | 8/1982 | Pachkowski et al. | |
| 4,381,978 | A | 5/1983 | Gratzel et al. | |
| 4,382,469 | A | 5/1983 | Bell et al. | |
| 4,397,823 | A | 8/1983 | Dimpel | |
| 4,427,636 | A | 1/1984 | Obenshain | |
| 4,448,935 | A | 5/1984 | Iovine et al. | |
| 4,454,835 | A | 6/1984 | Walsh et al. | |
| 4,463,245 | A | 7/1984 | McNeil | |
| 4,476,105 | A | 10/1984 | Greenbaum | |
| 4,477,283 | A | 10/1984 | Wilson, Sr. | |
| 4,488,935 | A | 12/1984 | Ruhe | |
| 4,508,040 | A | 4/1985 | Santen et al. | |
| 4,530,101 | A | 7/1985 | Fey et al. | |
| 4,531,043 | A | 7/1985 | Zverina et al. | |

| | | | |
|---|---|---|---|
| 4,544,470 | A | 10/1985 | Hetrick |
| 4,554,435 | A | 11/1985 | Wolf et al. |
| 4,567,346 | A | 1/1986 | Marhic |
| 4,617,031 | A | 10/1986 | Suh et al. |
| 4,622,115 | A | 11/1986 | O'Neill |
| 4,624,765 | A | 11/1986 | Cerkanowicz et al. |
| 4,626,648 | A | 12/1986 | Browning et al. |
| 4,670,048 | A | 6/1987 | Pineau |
| 4,670,139 | A | 6/1987 | Spruiell et al. |
| 4,685,963 | A | 8/1987 | Saville et al. |
| 4,761,793 | A | 8/1988 | Digne et al. |
| 4,774,026 | A | 9/1988 | Kitamori et al. |
| 4,776,638 | A | 10/1988 | Hahn |
| 4,791,268 | A | 12/1988 | Sanders et al. |
| 4,803,365 | A | 2/1989 | Krause et al. |
| 4,863,608 | A | 9/1989 | Kawai et al. |
| 4,868,127 | A | 9/1989 | Blades et al. |
| 4,886,118 | A | 12/1989 | Van Meurs et al. |
| 4,948,980 | A | 8/1990 | Wedekamp |
| 4,957,773 | A | 9/1990 | Spencer et al. |
| 4,998,486 | A | 3/1991 | Dighe et al. |
| 5,015,432 | A | 5/1991 | Koloc |
| 5,019,256 | A | 5/1991 | Ifill et al. |
| 5,019,268 | A | 5/1991 | Rogalla |
| 5,045,288 | A | 9/1991 | Raupp et al. |
| 5,048,404 | A | 9/1991 | Bushnell et al. |
| 5,082,054 | A | 1/1992 | Kiamanesh |
| 5,094,815 | A | 3/1992 | Conboy et al. |
| 5,120,450 | A | 6/1992 | Stanley, Jr. |
| 5,124,131 | A | 6/1992 | Wekhof |
| 5,126,111 | A | 6/1992 | Al-Ekabi et al. |
| 5,149,377 | A | 9/1992 | Esrom et al. |
| 5,166,950 | A | 11/1992 | Jouvaud et al. |
| 5,200,156 | A | 4/1993 | Wedekamp |
| 5,227,053 | A | 7/1993 | Brym |
| 5,243,169 | A | 9/1993 | Tateno et al. |
| 5,326,530 | A | 7/1994 | Bridges |
| 5,336,411 | A | 8/1994 | Andersson |
| 5,348,629 | A | 9/1994 | Khudenko |
| 5,368,724 | A | 11/1994 | Ayers et al. |
| 5,403,399 | A | 4/1995 | Kurihara et al. |
| 5,413,768 | A | 5/1995 | Stanley, Jr. |
| 5,439,595 | A | 8/1995 | Downey et al. |
| 5,439,652 | A | 8/1995 | Sczechowski et al. |
| 5,451,738 | A | 9/1995 | Alvi et al. |
| 5,472,567 | A | 12/1995 | Torregrossa |
| 5,529,701 | A | 6/1996 | Grisham et al. |
| 5,531,904 | A | 7/1996 | Grisham et al. |
| 5,534,232 | A | 7/1996 | Denes et al. |
| 5,609,736 | A | 3/1997 | Yamamoto |
| 5,609,777 | A | 3/1997 | Apunevich et al. |
| 5,611,896 | A | 3/1997 | Swanepoel et al. |
| 5,637,127 | A | 6/1997 | McLaughlin et al. |
| 5,655,210 | A | 8/1997 | Gregoire et al. |
| 5,660,743 | A | 8/1997 | Nemchinsky |
| 5,662,811 | A | 9/1997 | Grisham et al. |
| 5,664,733 | A | 9/1997 | Lott |
| 5,680,014 | A | 10/1997 | Miyamoto et al. |
| 5,696,380 | A | 12/1997 | Cooke et al. |
| 5,730,875 | A | 3/1998 | Grisham et al. |
| 5,738,170 | A | 4/1998 | Lavernhe |
| 5,738,281 | A | 4/1998 | Zurecki et al. |
| 5,746,984 | A | 5/1998 | Hoard |
| 5,760,363 | A | 6/1998 | Hackett et al. |
| 5,766,447 | A | 6/1998 | Creijghton |
| 5,832,361 | A | 11/1998 | Foret |
| 5,843,211 | A | 12/1998 | Bielefeldt |
| 5,866,910 | A | 2/1999 | Cooke et al. |
| 5,876,663 | A | 3/1999 | Laroussi |
| 5,879,555 | A | 3/1999 | Khudenko |
| 5,893,979 | A | 4/1999 | Held |
| 5,908,539 | A | 6/1999 | Young et al. |
| 5,979,551 | A | 11/1999 | Uban et al. |
| 5,994,705 | A | 11/1999 | Cooke et al. |
| 6,004,386 | A | 12/1999 | Grisham et al. |
| 6,007,681 | A | 12/1999 | Kawamura |
| 6,019,947 | A | 2/2000 | Kucherov |
| 6,054,097 | A | 4/2000 | Mass et al. |
| 6,090,296 | A | 7/2000 | Oster |

(56) References Cited

U.S. PATENT DOCUMENTS

| | | | |
|---|---|---|---|
| 6,117,401 | A | 9/2000 | Juvan |
| 6,182,585 | B1 | 2/2001 | Gonopolsky et al. |
| 6,187,206 | B1 | 2/2001 | Bernier et al. |
| 6,228,266 | B1 | 5/2001 | Shim |
| 6,355,178 | B1 | 3/2002 | Couture et al. |
| 6,362,449 | B1 | 3/2002 | Hadidi et al. |
| 6,377,602 | B1 | 4/2002 | Aita et al. |
| 6,410,880 | B1 | 6/2002 | Putvinski et al. |
| 6,514,469 | B1 | 2/2003 | Kado et al. |
| 6,565,803 | B1 | 5/2003 | Bolton et al. |
| 6,630,113 | B1 | 10/2003 | Surma |
| 6,693,253 | B2 | 2/2004 | Boulos et al. |
| 6,713,771 | B2 | 3/2004 | Nakagawa et al. |
| 6,749,759 | B2 | 6/2004 | Denes et al. |
| 6,765,779 | B2 | 7/2004 | Stevenson et al. |
| 6,802,890 | B2 | 10/2004 | Hyppanen |
| 6,863,827 | B2 | 3/2005 | Saraceno |
| 6,888,715 | B2 | 5/2005 | Stevenson et al. |
| 6,929,067 | B2 | 8/2005 | Vinegar et al. |
| 6,942,786 | B1 | 9/2005 | Fosseng |
| 6,982,421 | B2 | 1/2006 | Sato et al. |
| 6,987,792 | B2 | 1/2006 | Do et al. |
| 6,993,919 | B2 | 2/2006 | Hirooka et al. |
| 7,081,171 | B1 | 7/2006 | Sabol et al. |
| 7,086,468 | B2 | 8/2006 | De Rouffignac et al. |
| 7,096,953 | B2 | 8/2006 | De Rouffignac et al. |
| 7,121,342 | B2 | 10/2006 | Vinegar et al. |
| 7,128,816 | B2 | 10/2006 | Denes et al. |
| 7,153,398 | B2 | 12/2006 | Duzhev et al. |
| 7,182,874 | B2 | 2/2007 | Allard et al. |
| 7,262,384 | B2 | 8/2007 | Jackson |
| 7,303,657 | B2 | 12/2007 | Kong et al. |
| 7,422,695 | B2 | 9/2008 | Foret |
| 7,536,975 | B2 | 5/2009 | Denes et al. |
| 7,578,937 | B2 | 8/2009 | Foret |
| 7,622,693 | B2 | 11/2009 | Foret |
| 7,857,972 | B2 | 12/2010 | Foret |
| 7,882,646 | B2 | 2/2011 | Gorbell et al. |
| 7,893,408 | B2 | 2/2011 | Hieftje et al. |
| 7,897,053 | B2 | 3/2011 | Foret |
| 7,905,942 | B1 | 3/2011 | Layman |
| 7,985,342 | B2 | 7/2011 | Foret |
| 8,002,992 | B2 | 8/2011 | Foret |
| 8,063,000 | B2 | 11/2011 | Wilson |
| 8,074,439 | B2 | 12/2011 | Foret |
| 8,088,290 | B2 | 1/2012 | Foret |
| 8,110,100 | B2 | 2/2012 | Foret |
| 8,241,405 | B2 | 8/2012 | Salazar |
| 8,258,423 | B2 | 9/2012 | Severance, Jr. et al. |
| 8,263,896 | B2 | 9/2012 | Schneider |
| 8,263,897 | B2 | 9/2012 | Morrisroe |
| 8,278,810 | B2 | 10/2012 | Foret |
| 8,324,523 | B2 | 12/2012 | Foret |
| 8,329,044 | B2 | 12/2012 | Foret |
| 8,337,709 | B2 | 12/2012 | Foret |
| 8,338,709 | B2 | 12/2012 | Kodama et al. |
| 8,343,342 | B2 | 1/2013 | Foret |
| 8,357,873 | B2 | 1/2013 | Foret |
| 8,366,925 | B2 | 2/2013 | Foret |
| 8,568,663 | B2 | 10/2013 | Foret |
| 8,597,523 | B2 | 12/2013 | Foret |
| 8,636,960 | B2 | 1/2014 | Spitzl et al. |
| 8,734,643 | B2 | 5/2014 | Foret |
| 8,764,978 | B2 | 7/2014 | Foret |
| 8,865,631 | B2 | 10/2014 | Eldred et al. |
| 8,904,749 | B2 | 12/2014 | Foret |
| 9,051,820 | B2 | 6/2015 | Foret |
| 9,481,584 | B2 | 11/2016 | Foret |
| 2001/0046964 | A1 | 11/2001 | Percel et al. |
| 2001/0047964 | A1 | 12/2001 | Matherly et al. |
| 2002/0148562 | A1 | 10/2002 | Aoyagi et al. |
| 2003/0051992 | A1 | 3/2003 | Rappa |
| 2003/0101936 | A1 | 6/2003 | Lee |
| 2004/0020188 | A1 | 2/2004 | Kramer et al. |
| 2005/0013772 | A1 | 1/2005 | Patton et al. |
| 2006/0104849 | A1 | 5/2006 | Tada et al. |
| 2006/0196424 | A1 | 9/2006 | Swallow et al. |
| 2006/0252974 | A1 | 11/2006 | McVey et al. |
| 2007/0102152 | A1 | 5/2007 | Forgeron |
| 2007/0104610 | A1 | 5/2007 | Houston et al. |
| 2009/0118145 | A1 | 5/2009 | Wilson et al. |
| 2009/0235637 | A1 * | 9/2009 | Foret .......................... F02C 3/14 60/204 |
| 2011/0005999 | A1 | 1/2011 | Randal |
| 2011/0225948 | A1 | 9/2011 | Valeev et al. |
| 2014/0183033 | A1 | 7/2014 | Spitzl et al. |

FOREIGN PATENT DOCUMENTS

| | | |
|---|---|---|
| KR | 10-2004-0005107 | 1/2004 |
| RU | 2102587 | 1/1998 |
| WO | 94/16809 | 8/1994 |
| WO | 99/04607 | 1/1999 |

OTHER PUBLICATIONS

Blrbac: "Recommended Good Practice for the Thermal Oxidation of Waste Streams in a Black Liquor Recovery Boiler." Published Oct. 6, 1999.
Brandt, A. R., "Converting Green River oil shale to liquid fuels with Alberta Taciuk Processor: energy inputs and greenhouse gas emissions," Jun. 1, 2007.
Brandt, A. R., "Converting Green River oil shale to liquid fuels with the Shell in-situ conversion process: energy inputs and greenhouse gas emissions," Jun. 30, 2007.
Cones Brochure, The Double Life Corporation.
Extended European Search Report for EP 07755050.7, dated Dec. 29, 2011.
Extended European Search Report for EP 08840081, dated May 21, 2014.
International Search Report and Written Opinion for PCT/US2007/008529 dated Jun. 11, 2008.
International Search Report and Written Opinion for PCT/US2007/008640 dated Sep. 25, 2007.
International Search Report and Written Opinion for PCT/US2008/011926 dated Apr. 27, 2009.
International Search Report and Written Opinion for PCT/US2009/000937 dated Sep. 17, 2009.
International Search Report and Written Opinion for PCT/US2009/033979 dated Sep. 15, 2009.
International Search Report and Written Opinion for PCT/US2013/062941 dated Jan. 27, 2014.
International Search Report and Written Opinion for PCT/US2013/074506 dated Mar. 18, 2014.
International Search Report and Written Opinion for PCT/US2014/024991 dated Aug. 6, 2014.
International Search Report and Written Opinion for PCT/US2014/030090 dated Sep. 25, 2014.
Kavan, L, "Electrochemical Carbon," Chem Rev (1997), 97:3061-3082.
Lectures: On Illuminating Engineering Delivered at the John Hopkins University, Published 1911 Johns Hopkins Press, p. 140.
"Metalliferous Mining—Processing Cyclones Resource Book"—Aug. 2010, provided at https://rsteyn.files.wordpress.com/201 0/07/cyclones-basics.pdf.
NISTIR 6341 "Simulating Fire Whirls", Reprinted from Combustion Theory Modeling, (2000) vol. 4, 123-138.
NISTIR 6427 "The Fluid Dynamics of Whirls—An Inviscid Model", Feb. 2000, Building and Fire Research Library, National Institute of Standards and Technology.
O'Drill MCM, A Pump & Value Mfg. Company Catalog.
Understanding in-situ combustion, www.HeavyOilinfo.com, accessed Oct. 16, 2007.
Unleashing the potential: Heavy Oil, Supplement to E&P. Annual Reference Guide, www.eandp.info.com, Jun. 2007.

* cited by examiner

APPARATUS AND METHOD FOR SINTERING PROPPANTS

PRIORITY CLAIM AND CROSS-REFERENCE TO RELATED APPLICATIONS

This patent application is a divisional application of U.S. patent application Ser. No. 14/207,172 filed on Mar. 12, 2014 and entitled "Apparatus and Method for Sintering Proppants," claims priority to U.S. Provisional Patent Application Ser. No. 61/777,999 filed on Mar. 12, 2013, the entire contents of which are incorporated herein by reference.

This patent application is related to U.S. patent application Ser. No. 14/103,820, U.S. Pat. Nos. 5,832,361, 7,422,695, 7,578,937, 7,622,693, 8,074,439, 8,088,290, 8,278,810, 8,324,523, and other patents and patent applications of inventor Todd Foret.

FIELD OF THE INVENTION

The present invention relates generally to the field of hydraulic fracturing of subterranean formations in the earth and, more particularly, to a system, method and apparatus for sintering ceramic proppant particles used in the process of hydraulic fracturing of wells.

BACKGROUND OF THE INVENTION

The United States, as well as many other countries, has an abundant source of unconventional Oil and Gas resources located in shale formations. Hence, the term Shale Oil or Shale Gas. However, these tight shale formations require a unique completion method, referred to as hydraulically fracturing, to untrap the oil and/or gas and allow it to flow to the production tubing of the well. In order to keep the fractures open, the well must be propped open with a high strength material. This is similar to propping a door open with a wooden wedge or divider. However, in lieu of wooden wedge or dividers high strength material, such as frac sand and/or ceramic beads are pumped into the well and into the fissures formed from hydraulically fracturing the well. Proppants are used to "prop" open the oil or gas well during hydraulic fracturing of the well. Hence the term "proppant."

Frac sand is traditionally used as the proppant for most hydraulically fractured wells. However, the crush strength and spherical shape of frac sand is far inferior to that of ceramic proppants. Many Oil and Gas operators have turned to ceramic proppants to improve the conductivity or flow of the well after it has been hydraulically fractured. Due to the inherit superior spherical shape of ceramic proppants over frac sand, conductivity (flow) of ceramic proppants allows for enhanced gas and/or oil flow within the well. This is crucial for maximizing flow from the well.

Carbo Ceramics, Inc. manufactures an extensive line of proppants that range from resin-coated sand to ceramic proppants. For example, US Patent Application Publication No. US 2012/20231981 A1, which is hereby incorporated by reference in its entirety, describes various processes for manufacturing proppant particles.

The major issues associated with the manufacture of ceramic proppants are cost, production capacity and emissions. The traditional method for sintering ceramic proppants uses long rotary kilns fired with natural gas. First, the construction and installation of a new rotary kiln is expensive and requires a long lead-time (e.g., upwards of 18 to 24 months), so capacity expansion is difficult. Second, if the price of natural gas increases the production costs increase. On the other hand, when the price of natural gas decreases, operators tend to not drill gas wells and/or use frac sand. As a result, sales decrease for ceramic proppants. Third, many facilities utilizing rotary kilns must install expensive scrubbers to reduce air emissions. Other issues associated with long rotary kilns are size, footprint, plant location and regulatory permits. The combination of these problems causes long lead times and thus hampers a company's ability to increase production capacity to keep up with demand of high performance ceramic proppants as compared and contrasted to frac sand.

In addition, sintering time within a rotary kiln is exceptionally long in order to reach a typical sintering temperature of 2,800° F. to 3,000° F. Typical sintering times range from 30 minutes to over one hour. If temperature creeps beyond the sintering temperature, the lower melting point metals and/or minerals within the green proppant tend to melt and "plate" out within the kiln. Thus, the rotary kiln must be shutdown, cooled and repaired and of course adversely affects the plants production capacity.

Due to the abundance of natural gas and oil from shale plays, there exists a need for an alternative means for sintering proppants without using long rotary kilns.

SUMMARY OF THE INVENTION

The present invention provides an apparatus for sintering green pellets to make proppant particles. The apparatus includes: (a) a vessel having an overflow disposed in a first end, an underflow disposed in a second end, a middle portion having a circular cross-section disposed between the first end and the second end, and a tangential inlet proximate to the first end such that a gas from the tangential inlet flows along a vortex path from the first end to the second end of the vessel; (b) a first electrode extending through the overflow and a second electrode extending through the underflow, wherein both electrodes are at least partially disposed within the vessel, spaced apart from one another, and axially aligned with one another along a central axis of the vessel from the first end to the second end; and (c) one or more feed tubes extending through the overflow proximate to the first electrode. The electrodes are used to create an open electrical arc that sinters or partially sinters the green pellets from the one or more feed tubes in a selected temperature range to form the proppant particles as the green pellets pass between the electrical arc and the gas flowing in the vortex path and exit the underflow.

In addition, the present invention provides a method for sintering green pellets to make proppant particles. An apparatus is provided that includes: (a) a vessel having an overflow disposed in a first end, an underflow disposed in a second end, a middle portion having a circular cross-section disposed between the first end and the second end, and a tangential inlet proximate to the first end; (b) a first electrode extending through the overflow and a second electrode extending through the underflow, wherein both electrodes are at least partially disposed within the vessel, spaced apart from one another, and axially aligned with one another along a central axis of the vessel from the first end to the second end; and (c) one or more feed tubes extending through the overflow proximate to the first electrode. A gas is directed into the tangential inlet to flow in a vortex path from the first end to the second end of the vessel. An open electrical arc is created between the first electrode and the second electrode. The green pellets are dropped from the one or more feed tubes, such that the green pellets are sintered or partially sintered in a selected temperature range to form the proppant particles as the green pellets pass between the electrical arc and the gas flowing in the vortex path and exit the underflow.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to sintering green pellets to make proppant particles, but it will be understood that the concepts of the present invention are applicable to the manufacture or processing of particles at high temperatures.

The following patents are incorporated by reference in their entirety: U.S. Pat. No. 5,832,361; U.S. Pat. No. 7,422,695; U.S. Pat. No. 7,578,937; and U.S. Pat. No. 8,088,290. The systems, devices and methods disclosed in the foregoing patents can be adapted to sinter proppants as will be described below. The discussion herein focuses on FIG. 2 of these patents, but can be adapted to the other figures of these patents. As a result, the present invention is not limited to the vessel shapes shown.

Figure 1A:
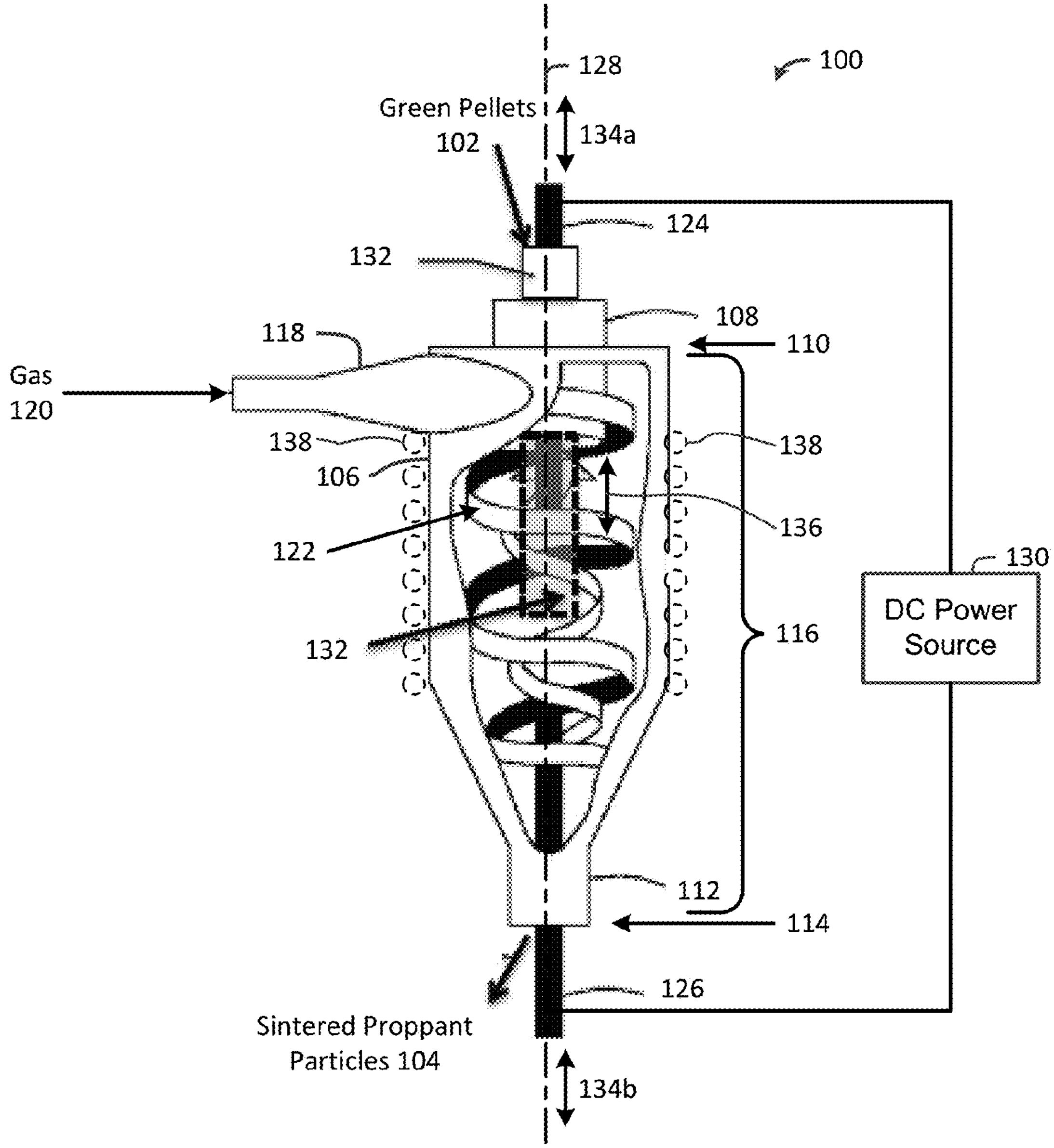
FIG. 1A is a diagram of an apparatus for sintering proppants in accordance with one embodiment of the present invention.
Figure 1B:
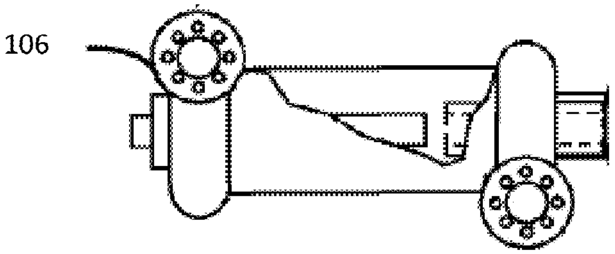
FIG. 1B is a diagram of vessel that can be used in an apparatus for sintering proppants in accordance with another embodiment of the present invention.

Now referring to FIG. 1A, an apparatus 100 for sintering green pellets 102 to make proppant particles 104 in accordance with one embodiment of the present invention is shown. The apparatus 100 includes a vessel 106 having an overflow 108 disposed in a first end 110, an underflow 112 disposed in a second end 114, a middle portion 116 having a circular cross-section disposed between the first end 110 and the second end 114, and a tangential inlet 118 proximate to the first end 110 such that a gas 120 from the tangential inlet 118 flows along a vortex path 122 from the first end 110 to the second end 114 of the vessel 106. The interior of the middle portion 116 of the vessel 106 can be cylindrical shaped (e.g., FIG. 1B), cone shaped, funnel shaped or a combination thereof. Moreover, the interior of the middle portion 116 of the vessel 106 can be coated or lined with special materials to prevent heat transfer out of the vessel 106, change the chemical properties occurring with the vessel or any other desired result. The exterior of the vessel 106 can be any shape (see e.g., FIG. 1B). In addition, the vessel 106 can be a cyclone separator, a hydrocyclone, or a gas-sparaged hydrocyclone. Note also that, as shown in FIG. 1B, the underflow 112 at the second end 114 can be a tangential outlet, nozzle or other exit configuration.

The apparatus 100 also includes a first electrode 124 extending through the overflow 108 and a second electrode 126 extending through the underflow 112, wherein both electrodes 124 and 126 are at least partially disposed within the vessel 106, spaced apart from one another, and axially aligned with one another along a central axis 128 of the vessel 116 from the first end 110 to the second end 114. The first electrode 124 and the second electrode 126 are used to create an electrical arc that produces a wave energy. The wave energy may include ultraviolet light, infrared light, visible light, sonic waves, supersonic waves, ultrasonic waves, electrons, cavitations or any combination thereof. The first electrode 124 and the second electrode 126 can be made of carbon or other suitable material. In addition, the first electrode 124 and the second electrode 126 can be made of a material that coats or chemically reacts with the green pellets 102. A linear actuator or other device can be used to move the first electrode 124 to and from the second electrode 126 in order to strike the electrical arc as shown by arrows 134*a*. The second electrode 126 can also be moved using a linear actuator or other device as shown by arrows 134*b*. A DC power source 130 is connected to the first electrode 124 and the second electrode 126. In some embodiments, the DC power source 130 can be one or more batteries or one or more solar powered batteries.

In addition, the apparatus 100 includes one or more feed tubes 132 extending through the overflow 108 proximate to the first electrode 124. As shown in FIG. 1, the one or more feed tubes 132 can be a single tube 132 having a larger diameter than the first electrode 124 such that the first electrode 124 is disposed within the single tube 132 and a gap separates the single tube 132 from the first electrode 124. This configuration synergistically forms a coaxial tube within a tube countercurrent heat exchanger. The countercurrent heat exchanger allows for preheating the green pellets 102 prior to exposure to the electrical arc. The one or more feed tubes 132 can also be a plurality of smaller feed tubes equally spaced around the first electrode 124. In another embodiment, the one or more feed tubes 132 are a single smaller feed tube adjacent to the first electrode 124. The one or more feed tubes 132 can extend past the first electrode 124 as shown in FIG. 1, or extend proximate to an end of the first electrode 124, or extend only to a point before the end of the first electrode 124. A linear actuator or other device can be used to adjust the position of the one or more feed tubes 132 as shown by arrows 136. The one or more feed tubes 132 can be made of an electrical insulating material, a material that coats or chemically reacts with the green pellets 102, or an electrically conductive material to form one or more third electrodes. Note also that a liquid can be mixed with the gas 120.

Preferably, the gas 120 is nitrogen because nitrogen is commonly used as a plasma gas. But, the gas 120 can be any other gas or combination of gases suitable to achieve the desired proppant particles 104. In addition, the green pellets 102 are typically made from minerals that commonly include fluoride. When heated within a large rotary kiln fluorine as well as nitrogen trifluoride are formed which must be scrubbed prior to emitting exhaust into the atmosphere. Not being bound by theory, it is believed that if any halogen species, for example fluorine and chlorine reacts with the nitrogen it will be destroyed within the present invention due to UV light. U.S. Pat. No. 5,832,361 described an apparatus and method for destroying nitrogen trichloride ($NCl_3$). Likewise, $NF_3$ can be decomposed with UV light and heat. Hence, water and/or any scrubbing fluid can be flowed into inlet 11 while nitrogen is added with the scrubbing fluid and/or referring to FIG. 3 of U.S. Pat. No. 7,422,695 the porous tube 14 as gas 15. Nitrogen can easily be separated from air with an Air Separation Unit ("ASU"). ASU's are very common within the oil and gas industry. As will be described in reference to FIG. 2, using nitrogen as the gas for the present invention allows for a closed loop proppants sintering process.

The electrodes 124 and 126 are used to create an open electrical arc that sinters or partially sinters the green pellets 102 from the one or more feed tubes 132 in a selected temperature range to form the proppant particles 104 as the green pellets 102 pass between the electrical arc and the gas 120 flowing in the vortex path 122 and exit the underflow 126. In one embodiment, the selected temperature range is between about 1,200° C. and 3,700° C. The selected temperature range can be based on a chemical composition of the green pellets 102, a size of the green pellets 102, a resonance time of the green pellets 102 within the vessel, or a combination thereof. Note that other parameters may also be used to determine the selected temperature range. Note that continually feeding the electrodes 124 and/or 126 allows for continuous operation. It will be understood that any electrically conductive material may be used for the electrode, such as carbon, graphite or copper. The present invention can also use an electrode material that can be coated unto the proppants. For example, titanium is a lightweight electrically conductive metal that is available in rods, bars or tubes which can be fed continuously for coating the proppants with a high strength lightweight metal. On the other hand, tungsten is a heavy electrically conductive metal that may be used to coat proppants.

Green pellets 102 (not sintered proppants 104) are very soft and can easily be crushed, shredded and/or comminuted when placed within the vortex or whirling flow of a cyclone. On the other hand, the eye of the gas 120 flowing or whirling in the vortex path moves at a very low to near zero speed and is, therefore, an ideal feed point for delicate materials such as green pellets 102. This allows for rapid sintering of proppants 104 (i.e., seconds as opposed to 30 minutes or more). The one or more feed tubes 132 drop or feed the green pellets 102 into the eye of the gas 120 flowing or whirling in the vortex path. All or part of the gas may exit through the overflow 108. Note that the sintering process may involve a single pass through a single apparatus 100, or multiple passes through a single apparatus 100, or a single pass through multiple apparatuses 100 (FIG. 4B).

In another embodiment, the apparatus 100 may include a heated gas source connected to the one or more feed tubes 132 to pre-heat the green pellets 102. The heated gas source can be a high temperature blower, a high temperature compressor, an electrical heater or heated gas source, a burner, a thermal oxidizer, a jet exhaust, an oxy-fuel torch, a plasma torch, an internal combustion engine exhaust, or a combination thereof.

In another embodiment, the vessel 106 also includes a radio frequency source 138 (e.g., one or more radio frequency coils, a waveguide, or a combination thereof, etc.) attached to or disposed within the vessel 106. The microwave source and/or induction coils 138 can inductively couple to the plasma utilizing radio frequency in the range of 0.5 kHz to 300 MHz. The carbon arc may provide the excitation energy for either the microwaves or RF energy to couple to and form a global plasma within the eye. However, susceptors may be located within the vessel 106 in order to ignite the plasma and allow for coupling and sustaining the plasma. Likewise, the inductively coupled plasma is sustained within the eye. The green pellets 102 drop down the vertical axis of the eye and through the inductively coupled plasma and are discharged through the bottom of the vessel 106. Plasma can couple to Radio Frequency Energy (e.g., inductively coupled ("IC") plasma torches, etc.). The present inventor's Plasma Whirl® Reactor is an IC Plasma Torch. The Radio Frequency ("RF") Spectrum ranges from about 3 kHz to 300 GHz. Induction heating commonly employs RF coils ranging in frequency from 0.5 kHz to 400 kHz. Likewise, microwave frequencies commonly found in household microwave ovens normally operate at 2,450 Mega Hertz (2.450 GigaHertz) and at a power of 300 watts to 1,000 watts. Commercial microwave ovens ranging in power from 6 kw to 100 kw typically operate at a frequency of 915 MHz (Mega Hertz).

As previously stated RF energy can couple to a gas and form plasma. Coupling efficiency is based upon several variables ranging from the gas type, gas flow rate, frequency, cavity and/or reactor shape and volume. The three major issues with plasma are igniting, sustaining and confining the plasma. Igniting and sustaining plasma with an electrical arc is fairly straightforward and simple. DC plasma torches utilize inertial confinement to maximize and transfer energy to the work piece. Likewise, plasma confinement is necessary to prevent melting of the torch itself. However, plasma ignition with RF energy is quite difficult. Consequently, many RF torches using an RF coil or a Microwave source typically employ a susceptor to ignite the plasma. The susceptor is simply a pointed metal rod that will absorb the RF energy, heat up and then emit an electron via thermionic emission. As a result, the spark ignites any gases present and forms the plasma. Note that using a DC plasma torch as the heater allows for increasing the bulk plasma volume by simply turning on the RF coil or Microwave generator and injecting wave energy in the form of photons emitted from the RF coil or the Microwave magnetron to enhance the plasma.

Figure 2:
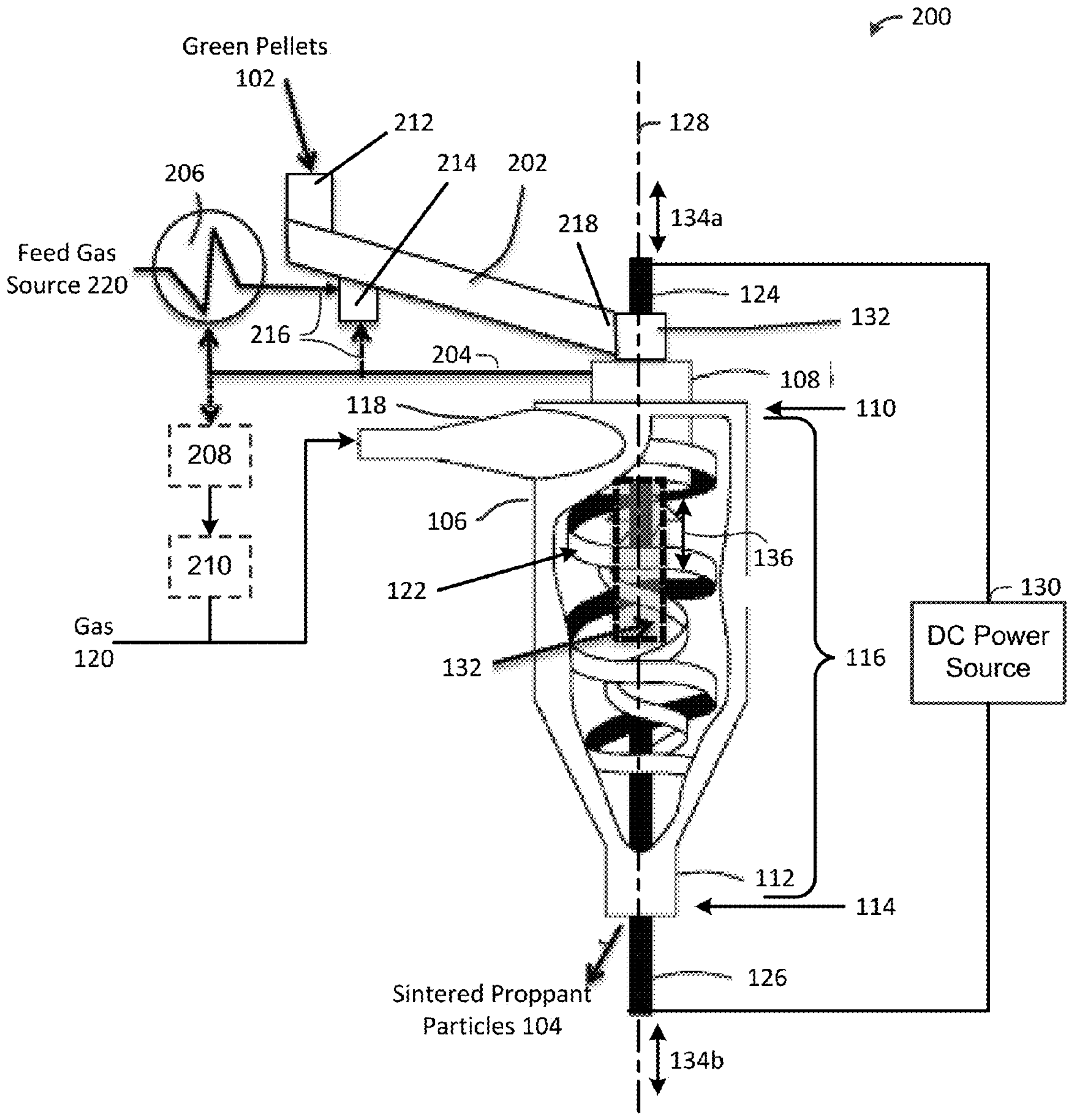
FIG. 2 is a diagram of an apparatus for sintering proppants in accordance with another embodiment of the present invention.

Referring now to FIG. 2, an apparatus 200 for sintering green pellets 102 to make proppant particles 104 in accordance with one embodiment of the present invention is shown. Apparatus 200 includes the same apparatus 100 as previously described in reference to FIG. 1 with the addition of a gas slide 202 and a gas line 204. Optional components include a gas-to-gas heat exchanger 206, a hot gas clean up device 208 and/or a gas compressor 210. The gas slide 202 has a first inlet 212 for the green pellets 102, a second inlet 214 for a feed gas 216 and an outlet 218 connected to the one or more feed tubes 132. The gas slide 202, also commonly referred to as air slides, provide a preferred conveyor for gently feeding green pellets 102 into the one or more feed tubes 132. Pneumatic air slides are common and available from such vendors as Dynamic Air, WG Benjey and FL Smidth ("Fuller® Airslide™ Conveying Technology"). Other mechanisms (e.g., shaker trays, conveyors, etc.) for transferring the green pellets 102 to the one or more feed tubes 132 can be used.

The feed gas 216 used for the gas slide 202 can be supplied in a variety of ways, such as a separate feed gas source 220, or a gas line 204 connecting the overflow 108 to the second inlet 214 of the gas slide 202 such that the feed gas 216 is at least a portion of the hot gas that exits the overflow 108. A valve or regulator attached to the gas line 204 can be used to control a pressure of the feed gas 216. Moreover, the feed gas 216 can be heated to preheat the green pellets 102 using a heater (not shown) or the gas-to-gas heat exchanger 206. As shown, the gas-to-gas heat exchanger 206 is connected to the feed gas source 220, the second inlet 214 of the gas slide 202 and the gas line 204 such that heat from the hot gas exiting the overflow 108 is transferred to the feed gas 216. Note that any gas may be used as the feed gas 216 and it is not necessary to use the hot gas exiting from the overflow 108.

The heater (not shown) may be selected but is not limited to a group that includes a high temperature blower or compressor, electrical heater or heated gas source, burner, thermal oxidizer, jet rocket, oxy-fuel torch, plasma torch and/or even the exhaust from an internal combustion engine such as a reciprocating engine or gas turbine engine. The utilization of engine exhaust allows for generating electricity while sintering proppants. Hence, a unique cogenerating system—generating electricity while producing proppants. In another example, the heater includes another electrode proximate to inlet 118. For example, the heater can be the DC Plasma ArcWhirl® Torch disclosed in U.S. Pat. Nos. 8,074,439 and 8,278,810 and 7,622,693 and 8,324,523 which are hereby incorporated by reference in their entirety. Likewise, an ideal heater or heated gas source may be the thermal oxidizer shown in FIG. 6 of U.S. Pat. No. 8,074,439 or the plasma rocket as disclosed in FIG. 7 of U.S. Pat. No. 8,074,439.

The gas line 204 can also be used to recirculate at least a portion of the gas 120 that exits the overflow 108 back into the tangential inlet 118 creating a closed loop or partially closed loop process. To enhance efficiency, a hot gas clean up device 208 and/or a gas compressor 210 can be attached to the gas line 204 and the tangential inlet 118. Other components can be added to the apparatus 200 as will be appreciated by those skilled in the art.

In one embodiment of the present invention, the use of multiple small diameter vessels fed from a common header provides for a compact proppant manufacturing plant or system that is efficient and scalable. Likewise, this configuration enables the plant to increase production capacity via small increments and not through the purchase of one long rotary kiln or one large plasma process. The present invention allows the proppants to be manufactured in a multi-stage sintering process wherein addition materials can be added to, coated or reacted with the proppants to produce new and improved characteristics. Moreover, the ability to use off-the-shelf and/or modified high temperature and high pressure cyclones sourced from the oil and gas industry as a component for a plasma proppant manufacturing system allows for a relatively compact, modular and inexpensive plant that could be built in a timely fashion. Finally, the present invention provides a system that can be mounted on a skid, trailer, truck, rail car, barge or ship and operated at or near the drilling operation, which greatly reduces the cost of the proppants by saving expensive storage and transportation costs.

Figure 3:
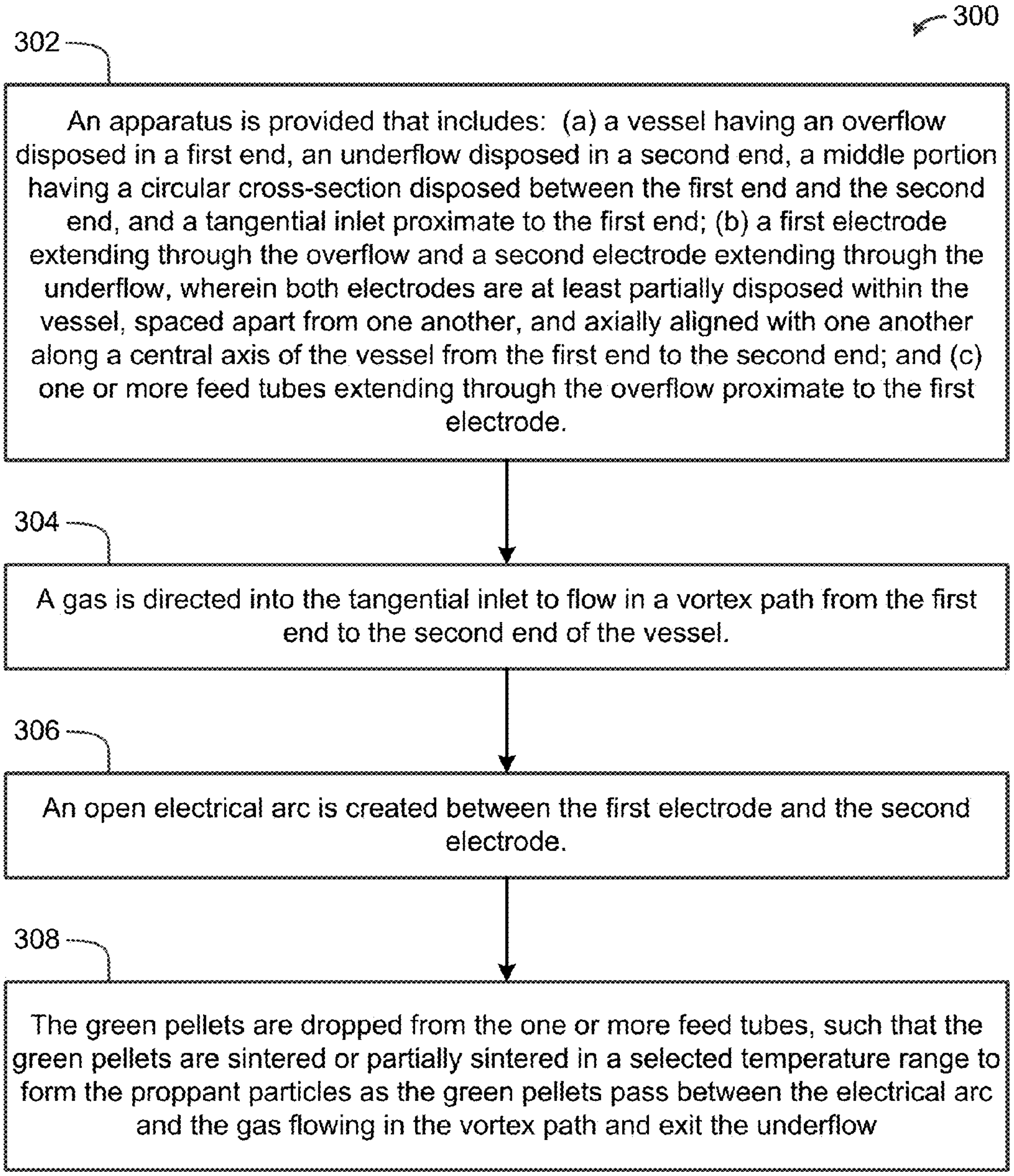
FIG. 3 is a flow chart of a method for sintering proppants in accordance with another yet embodiment of the present invention.

Now referring to FIG. 3, a flow chart of a method 300 for sintering green pellets to make proppant particles is shown. An apparatus is provided in block 302 that includes: (a) a vessel having an overflow disposed in a first end, an underflow disposed in a second end, a middle portion having a circular cross-section disposed between the first end and the second end, and a tangential inlet proximate to the first end; (b) a first electrode extending through the overflow and a second electrode extending through the underflow, wherein both electrodes are at least partially disposed within the vessel, spaced apart from one another, and axially aligned with one another along a central axis of the vessel from the first end to the second end; and (c) one or more feed tubes extending through the overflow proximate to the first electrode. A gas is directed into the tangential inlet to flow in a vortex path from the first end to the second end of the vessel in block 304. An open electrical arc is created between the first electrode and the second electrode in block 306. The green pellets are dropped from the one or more feed tubes in block 308, such that the green pellets are sintered or partially sintered in a selected temperature range to form the proppant particles as the green pellets pass between the electrical arc and the gas flowing in the vortex path and exit the underflow. Other steps may be provided as is apparent from the description of the apparatus 100 and 200 above, or will be apparent to those skilled in the art.

Figure 4A:
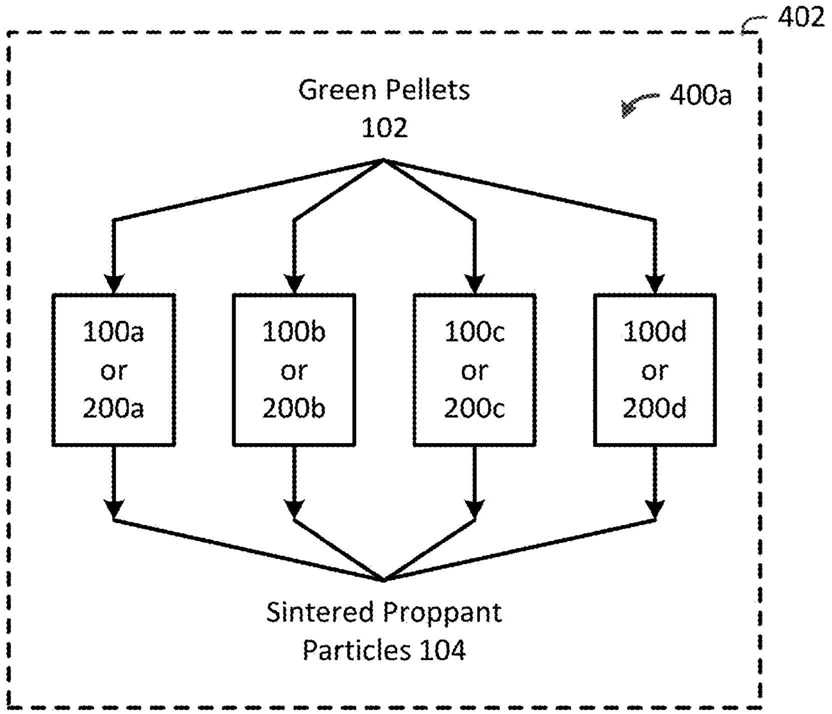
FIGS. 4A and 4B are block diagrams of various embodiments of a system in accordance with another yet embodiment of the present invention.
Figure 4B:
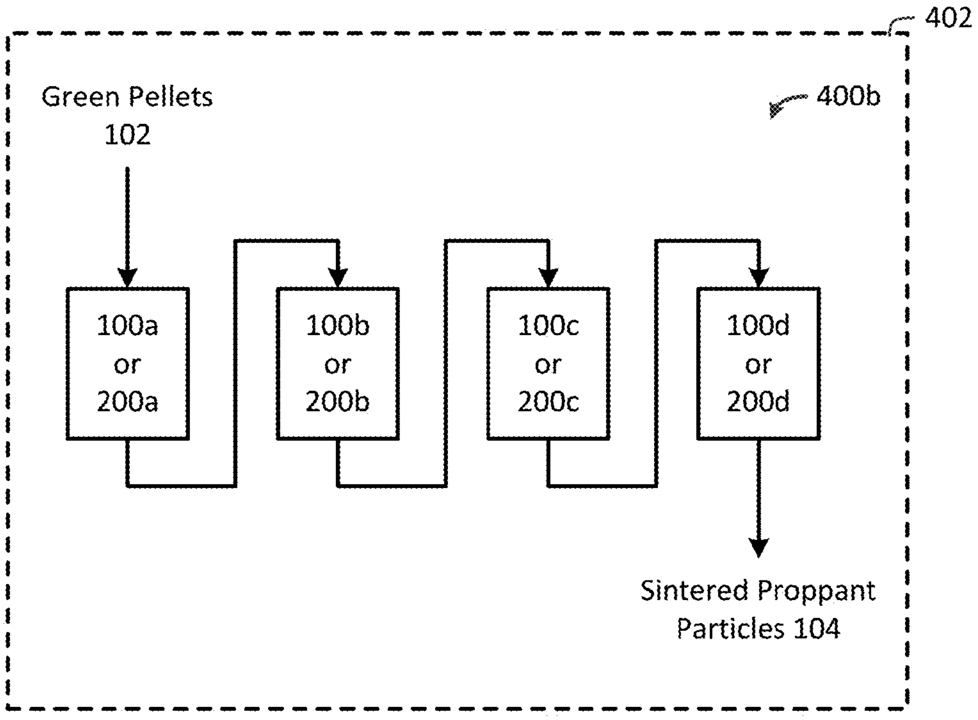

Referring now to FIGS. 4A and 4B, block diagrams of various embodiments of a system 400 is shown. FIG. 4A shows a processing system 400*a* in which the green pellets 102 are processed (one pass or multiple passes) by each apparatus (100*a* or 200*a*; 100*b* or 200*b*; 100*c* or 200*c*; 100*d* or 200*d*) in parallel to produce the sintered proppant particles 104. System 400*a* is easily scalable to accommodate increasing/decreasing demand. System 400*a* can be in a building or made portable by mounting the system on a skid, trailer, truck, rail car, barge or ship 402. FIG. 4B shows a processing system 400*b* in which the green pellets 102 are processed by each apparatus (100*a* or 200*a*; 100*b* or 200*b*; 100*c* or 200*c*; 100*d* or 200*d*) in series to produce the sintered proppant particles 104. Note that system 400*b* can be setup as a tower or pancake arrangement in which the apparatuses are stacked or vertically aligned with one another. System 400*b* can be made scalable by disconnecting one or more of the apparatuses to accommodate increasing/decreasing demand. System 400*b* can be in a building or made portable by mounting the system on a skid, trailer, truck, rail car, barge or ship 402.

The foregoing description of the apparatus and methods of the invention in described embodiments and variations, and the foregoing examples of processes for which the invention may be beneficially used, are intended to be illustrative and not for purposes of limitation. The invention is susceptible to still further variations and alternative embodiments within the full scope of the invention, recited in the following claims.

What is claimed is:

1. A method for sintering green pellets to make proppant particles comprising the steps of:

providing an apparatus comprising:

a vessel having an overflow disposed in a first end, an underflow disposed in a second end, a middle portion having a circular cross-section disposed between the first end and the second end, and a tangential inlet proximate to the first end, a first electrode extending through the overflow and a second electrode extending through the underflow, wherein both electrodes are at least partially disposed within the vessel, spaced apart from one another, and axially aligned with one another along a central axis of the vessel from the first end to the second end, and one or more feed tubes extending through the overflow proximate to the first electrode;

directing a gas into the tangential inlet to flow in a vortex path from the first end to the second end of the vessel;

creating an open electrical arc between the first electrode and the second electrode; and dropping the green pellets from the one or more feed tubes, such that the green pellets are sintered or partially sintered in a selected temperature range to form proppant particles as the green pellets pass between the electrical arc and the gas flowing in the vortex path and exit the underflow.

2. The method as recited in claim 1, further comprising the step of adding a material to the gas that coats or chemically reacts with the green pellets.

3. The method as recited in claim 1, wherein the one or more feed tubes extend past the first electrode.

4. The method as recited in claim 1, wherein the one or more feed tubes comprise a single tube having a larger diameter than the first electrode such that the first electrode is disposed within the single tube and a gap separates the single tube from the first electrode.

5. The method as recited in claim 1, wherein the one or more feed tubes are made of an electrical insulating material or comprise one or more third electrodes.

6. The method as recited in claim 1, further comprising the step of configuring the apparatus to sinter or partially sinter the green pellets in the selected temperature range which is between about 1,200° C. and 3,700° C.

7. The method as recited in claim 1, further comprising the step of selecting the selected temperature range based on a chemical composition of the green pellets, a size of the green pellets, a resonance time of the green pellets within the vessel, or a combination thereof.

8. The method as recited in claim 1, further comprising a radio frequency source attached to or disposed within the vessel.

9. The method as recited in claim 1, further comprising the step of releasing a material contained in the first electrode or the second electrode or the one or more feed tubes using the electrical arc, and coating or chemically reacting the material with the green pellets.

10. The method as recited in claim 1, further comprising the step of mixing a liquid with the gas.

11. The method as recited in claim 1, wherein a portion of the gas exits through the overflow.

12. The method as recited in claim 1, further comprising the step of pre-heating the green pellets using a heated gas source connected to the one or more feed tubes.

13. The method as recited in claim 1, further comprising the step of supplying the green pellets using a gas slide having a first inlet for the green pellets, a second inlet for a feed gas and an outlet connected to the one or more feed tubes.

14. The method as recited in claim 13, further comprising the step of heating the feed gas using a heater connected to the second inlet.

15. The method as recited in claim 13, further comprising the step of controlling a pressure of the feed gas using a valve or regulator attached to a gas line connecting the overflow to the second inlet of the gas slide such that the feed gas comprises at least a portion of the gas that exits the overflow.

16. The method as recited in claim 13, further comprising the step of heating the feed gas using a gas-to-gas heat exchanger connected to a feed gas source, the second inlet of the gas slide and a gas line connected to the overflow, wherein a portion of the gas exits the overflow.

17. The method as recited in claim 1, further comprising the step of recirculating a portion of the gas that exits the overflow to the tangential inlet using a gas line connecting the overflow to the tangential inlet.

18. The method as recited in claim 1, further comprising the step of adjusting a position of the one or more feed tubes or the first electrode or the second electrode within the vessel using a linear actuator connected to the one or more feed tubes or the first electrode or the second electrode.

19. The method as recited in claim 18, further comprising the step of moving the first electrode or the second electrode to strike the electrical arc between first electrode and the second electrode using the linear actuator.

20. The method as recited in claim 8, wherein the radio frequency source comprises one or more radio frequency coils, a waveguide, or a combination thereof.

21. The method as recited in claim 1, further comprising a DC power source connected to the first and second electrodes.

22. The method as recited in claim 21, wherein the DC power source comprises one or more batteries or one or more solar powered batteries.

23. The method as recited in claim 1, wherein an interior of the middle portion of the vessel is cylindrical shaped, cone shaped, funnel shaped or a combination thereof.

24. The method as recited in claim 1, wherein the vessel comprises a cyclone separator, a hydrocyclone, or a gas-sparaged hydrocyclone.

25. The method as recited in claim 12, wherein the heated gas source comprises a high temperature blower, a high temperature compressor, an electrical heater or heated gas source, a burner, a thermal oxidizer, a jet exhaust, an oxy-fuel torch, a plasma torch, an internal combustion engine exhaust, or a combination thereof.

26. The method as recited in claim 17, further comprising the step of processing the recirculated gas using a hot gas clean up device attached to the gas line and the tangential inlet.

27. The method as recited in claim 17, further comprising controlling a pressure of the recirculated gas using a gas compressor attached to the gas line and the tangential inlet.

28. The method as recited in claim 1, further comprising the step of mounting the apparatus on a skid, trailer, truck, rail car, barge or ship.

29. A method for sintering green pellets to make proppant particles comprising the steps of:

providing an apparatus comprising:

a vessel having an overflow disposed in a first end, an underflow disposed in a second end, a middle portion having a circular cross-section disposed between the first end and the second end, and a tangential inlet proximate to the first end, a first electrode extending through the overflow and a second electrode extending through the underflow, wherein both electrodes are at least partially disposed within the vessel, spaced apart from one another, and axially aligned with one another along a central axis of the vessel from the first end to the second end, a linear actuator connected to the first electrode or the second electrode, a DC power source connected to the first and second electrodes, one or more feed tubes extending through the overflow proximate to the first electrode, and a heated gas source connected to the one or more feed tubes;

directing a gas into the tangential inlet to flow in a vortex path from the first end to the second end of the vessel;

creating an open electrical arc between the first electrode and the second electrode by moving the first electrode or the second electrode to strike the electrical arc between first electrode and the second electrode using the linear actuator;

pre-heating the green pellets within the one or more feed tubes using the heated gas source; and dropping the green pellets from the one or more feed tubes, such that the green pellets are sintered or partially sintered to form proppant particles as the green pellets pass between the electrical arc and the gas flowing in the vortex path and exit the underflow.

* * * * *